P. I. ANDERSON.
PROCESS FOR MAKING TIRES.
APPLICATION FILED JAN. 28, 1919.

1,335,150.

Patented Mar. 30, 1920.

INVENTOR
Paul I. Anderson
BY his Attys

WITNESS

UNITED STATES PATENT OFFICE.

PAUL I. ANDERSON, OF DES MOINES, IOWA.

PROCESS FOR MAKING TIRES.

1,335,150.　　　Specification of Letters Patent.　　Patented Mar. 30, 1920.

Application filed January 28, 1919. Serial No. 273,663.

*To all whom it may concern:*

Be it known that I, PAUL I. ANDERSON, a citizen of the United States, and a resident of Des Moines, in the county of Polk and State of Iowa, have invented a certain new and useful Process for Making Tires, of which the following is a specification.

In applying my invention I provide in connection with a mold member, an annular ring designed to be placed in such position with relation to the mold member as to permit the proper stretching of the side of a tire for completing the tire, and putting the bead at the edge of the tire, so that the tire may be completed without wrinkling or buckling, or in any way pulling the fabric of the tire out of proper shape.

More particularly the object of my invention is to provide a process for making tires, whereby the above desirable objects may be attained.

With these and other objects, my invention consists in the construction and arrangement of the details of my invention, as hereinafter more fully described, illustrated in the accompanying drawings and set forth in my claim, and as described in my process and claim thereon:

In the accompanying drawings, Figure 1 shows a vertical, sectional view through a ring embodying my invention.

Figure 1:
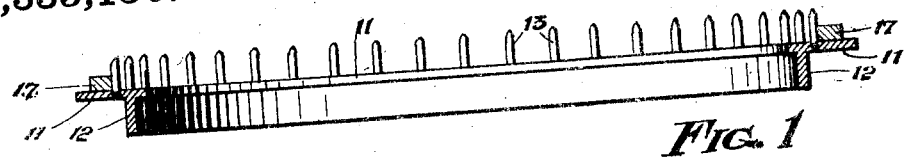

In the accompanying drawings I have used the reference numeral 10 to indicate generally the inner mold member of the type commonly used in pneumatic tire factories.

In the manufacture of pneumatic tires, the fabric is stretched over the mold member 10 and the tire is shaped and thereafter the side edges of the fabric are stitched down along the line A or bead line.

When the outer mold members are then placed on the tire, it frequently happens that the material wrinkles or buckles with the result of serious defects in the tire.

In some instances after the fabric has been stretched on the inner mold member, the inner mold member is removed and a pneumatic bag is substituted which is expanded under heavy pressure after the outer mold member has been placed on the tire. The latter process works fairly successfully in doing away with wrinkling or buckling of the fabric, but is very expensive.

Figure 3:
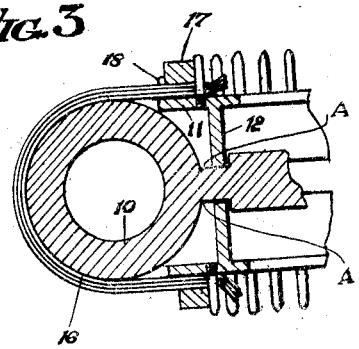
Fig. 3 shows a sectional view taken on the line 3—3 of Fig. 1.

It is my purpose to provide a simple means and process whereby this wrinkling and buckling may be done away with and yet the cost of making the tire will be decreased rather than increased.

Where my device is used I provide an annular ring 11 preferably made in two parts for convenience in handling, and comprising a flat annular plate having between its edges a flange 12, which, in case the ring is in the upper position shown in Fig. 3, extends downwardly.

The ring 11 may be provided with a series of fastening or engaging means such, for instance, as the pins 13.

These devices serve as fastening devices and also serve as a means for engaging the ring 11, hereinafter more fully described, whereby the position of the bead wire is gaged.

Figure 4:
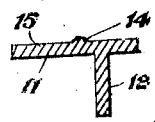
Fig. 4 shows a sectional view of a modified form of my ring.

In Fig. 4 I have shown a sectional view of a modified form of my ring in which the ring 11 is provided with a rib 14 which serves as a gaging means, and cement 15 may be used for fastening purposes.

In Fig. 3 I have shown an upper and lower ring, but as a matter of fact, in actual practice, the workman preferably uses only one ring for each tire.

The ring is placed in the position of the upper ring, shown in Fig. 3, with the flange 12 resting on the portion of the mold member 10.

The fabric 16 layer by layer is stretched around the circumference of the mold member 10 to which it will stick on account of its tension or on account of the use of cement, depending upon the process used in the tire factory.

After the layer of fabric has been stretched around the mold member 10, the upper side edge is gripped and is pulled toward the center of the annular mold until the edge of the fabric rests on the ring 11.

Figure 2:
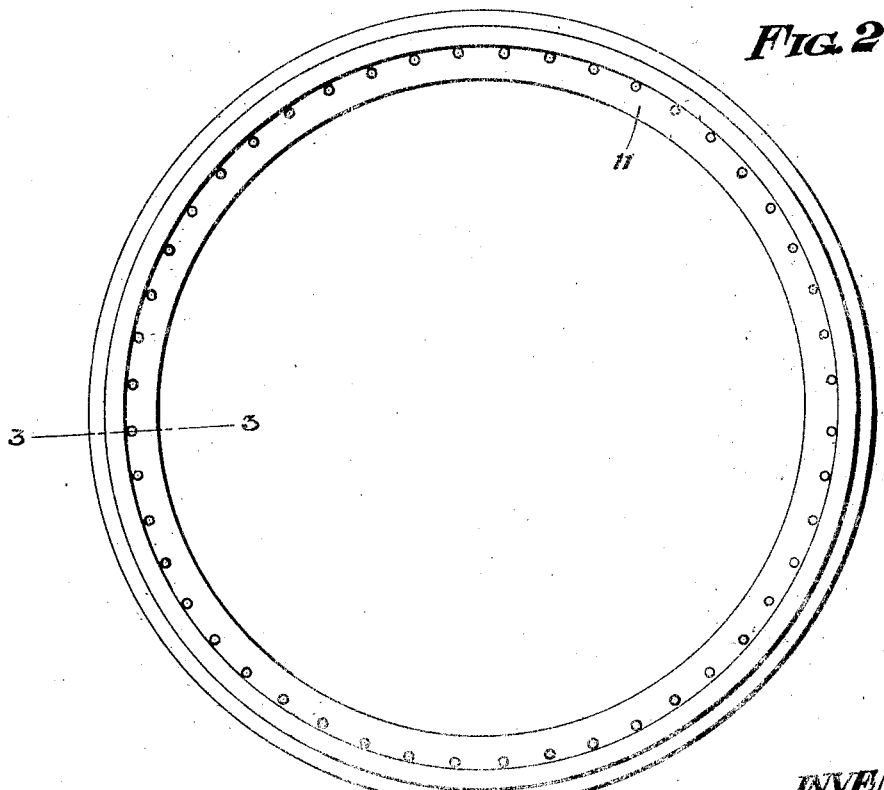
Fig. 2 shows a top or plan view of the same installed in position with relation to a mold member.

In the form of the device shown in Figs. 1 to 3, the fabric is fastened to the pins 13. In the form of the device shown in Fig. 4, the fabric is held by cement on the ring.

Layer after layer is placed in position and stretched until the workman desires to form the bead, whereupon the gage ring 17 is placed on the ring 11, as illustrated in Fig. 3, just outside the pins 13 on the rib 14 or other gage device on the ring 11.

The bead wire 18 is then placed on the fabric adjacent to the gage ring 17, as illustrated in Fig. 3, whereupon the gage ring 17 is removed, and in different factories slightly different methods are employed, but, for instance, the fabrics may be curled over the bead wire 18, and other layers of fabric may then be placed on the mold and stretched in a similar manner.

After the proper amount of fabric has been placed in position and stretched, as hereinbefore described, on one side, the mold is turned over, and the fabric on the other side is stretched in the same way and the bead formed.

It will be understood that the ring is reversible and after having been used for stretching one side of the tire may be removed and the tension of the material will hold the side of the tire in horizontal position, when the mold is turned over, and the ring may then be used for the other side of the tire.

After the beads have been formed, and the proper amount of fabric placed on the tire, the ring is entirely removed and the gum or rubber is placed on the outside of the tire; then the upper and lower outer mold members are drawn together and the inner movement of the outer mold members will cause said outer mold members to engage the beads formed in the tire and force them inwardly toward the bead lines A. The fabric used for making tires will stretch to a substantial extent, and when stretched by the action of the outer mold member, after the fabric has been stretched, and the bead formed in the manner hereinbefore described, the whole tire will be completed without any wrinkles or buckling.

It is obvious from the foregoing that various forms of mechanism may be used for embodying the real spirit and intent of my invention, and that changes may be made in the particular construction of the device shown herein without departing from such spirit, and it is my intention to cover by my claim any reasonable form in which my real invention may be embodied.

It will be seen that my process involves the placing of the fabric on an inner mold member, and the stretching of the sides of the tire horizontally or substantially horizontally.

In this connection it may be mentioned that the stretching may be slightly out of the horizontal, depending upon the amount of final stretching that it is desired to secure when the outer mold member is placed on the tire.

My process then involves the fastening of the outer edges of the tire in any suitable way; the gaging of the position for the bead wire and the forming of the bead while the tire side is stretched in substantially horizontal position, the completion of the placing of the fabric on the tire and the forming of the bead, and the placing of the outer mold member of the tire in such a way as to cause the outer mold member to engage the bead and force it inwardly for stretching the tire and taking all wrinkles and buckling out of it.

It may be mentioned that when I use the term "horizontal" hereinbefore set forth, what I really mean is that the side of the tire should be formed in a plane substantially parallel with that in which the inner mold member rests.

I claim as my invention:

The process of making tires comprising the stretching of tire fabric around an inner mold member, the stretching of fabric at the side edges of the tire in a plane substantially parallel with the plane in which the inner mold member rests, the forming of the bead at the side of the tire while the side edges are so stretched, the placing of the gum or rubber on the tire, and the subjecting of the tire thus far completed to the pressure of outer mold members, whereby the bead is forced to its final position in the tire for thereby preventing any wrinkling or buckling of the tire material.

Des Moines, Iowa, January 24, 1919.

PAUL I. ANDERSON.